Oct. 28, 1947.  C. J. CARDONA  2,429,803
TRIPOD HEAD
Filed Jan. 11, 1945  2 Sheets-Sheet 2
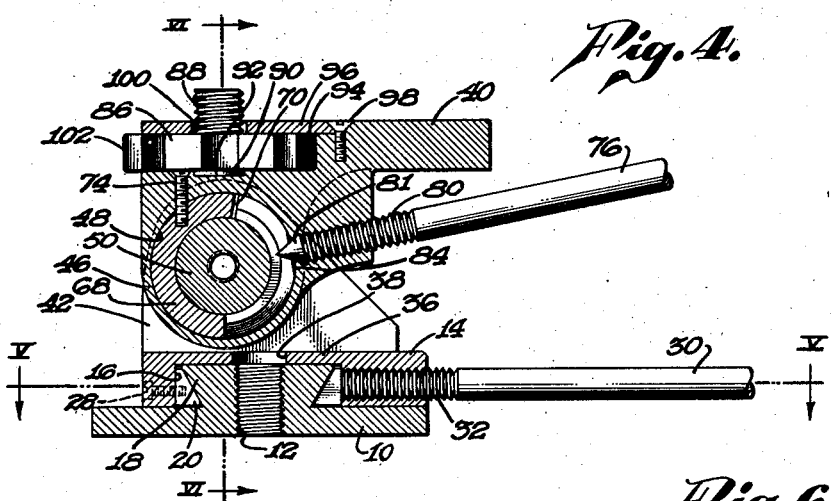
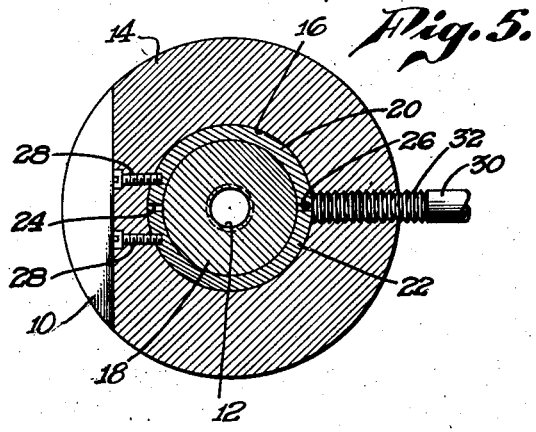
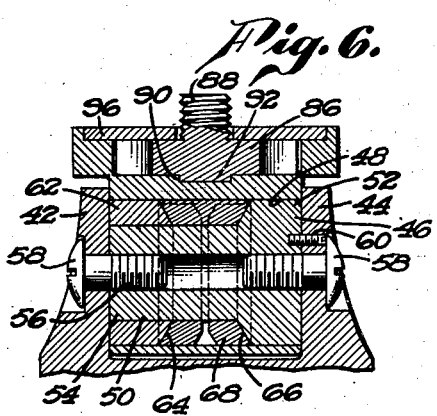
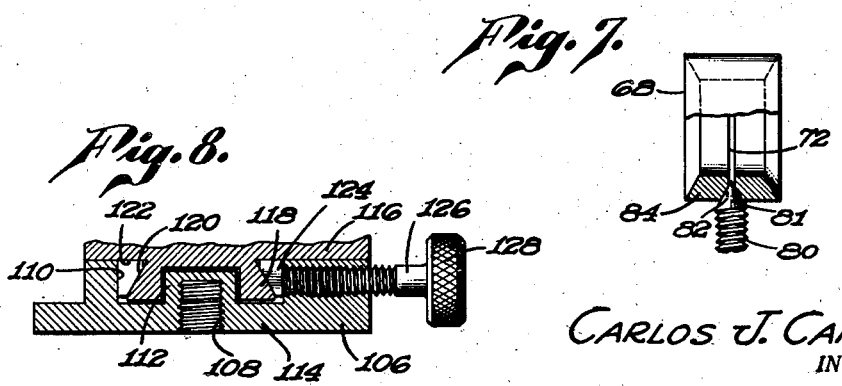
CARLOS J. CARDONA,
INVENTOR.
BY
ATTORNEY.

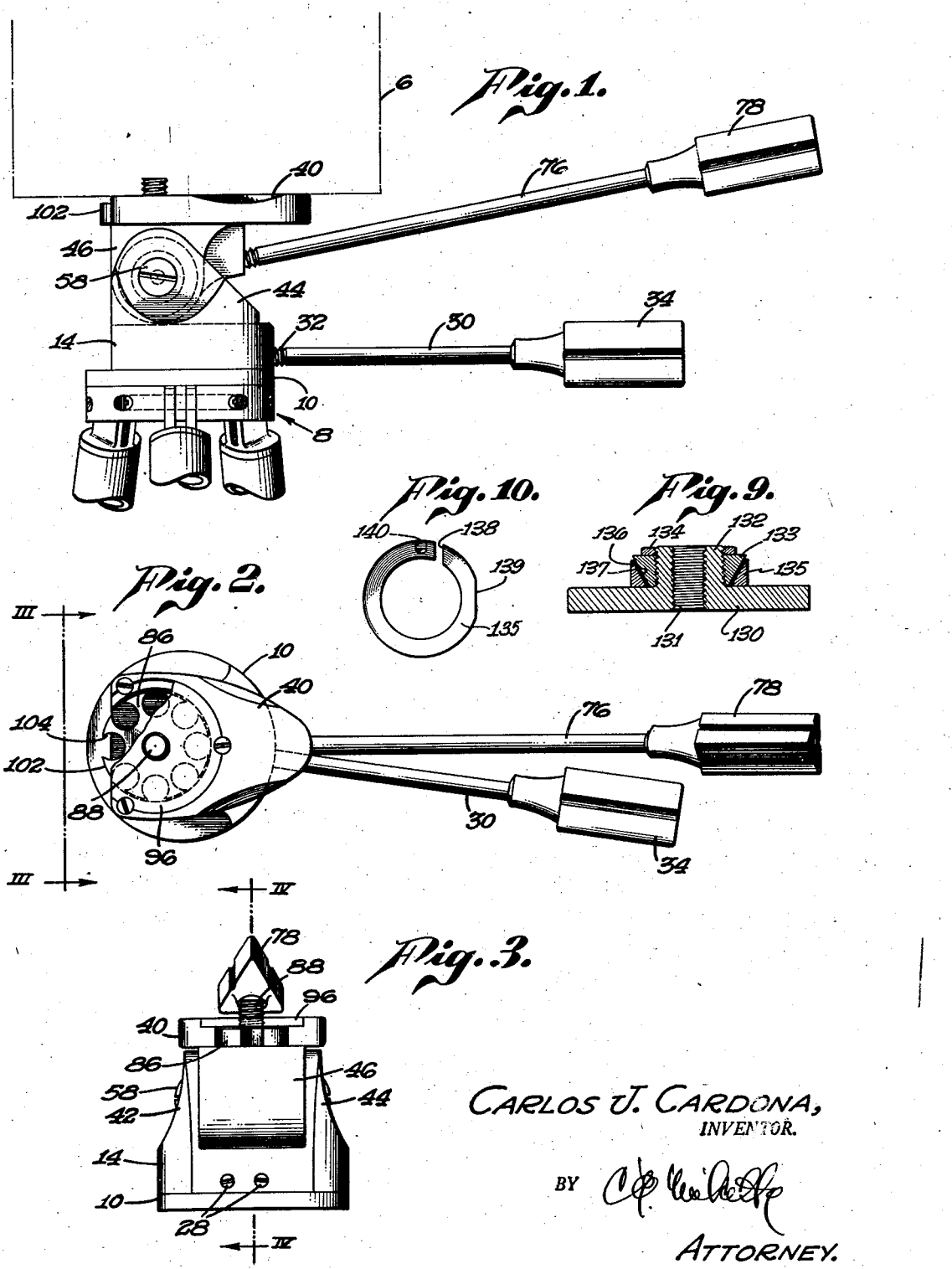

Patented Oct. 28, 1947

2,429,803

UNITED STATES PATENT OFFICE 2,429,803

TRIPOD HEAD

Carlos J. Cardona, North Hollywood, Calif.

Application January 11, 1945, Serial No. 572,329

9 Claims. (Cl. 248—183)

My invention relates to photographic accessories and particularly to a head for mounting a camera upon a tripod so that the camera can be moved in both a horizontal and a vertical plane.

For carefully adjusting a camera so that it is oriented properly with respect to the field of view, it is desirable to have a mounting sufficiently precise so that the camera may be moved back and forth through short distances easily and smoothly so that when the camera is shifted slightly in the horizontal plane, for example, it will not disturb the setting in a vertical plane.

Furthermore, on the tripod head which permits the adjustment of the camera there should be a locking means sufficiently sensitive and smooth-operating that after the camera has been shifted to the proper vertical and horizontal position, operation of either locking means will not disturb either setting. To accomplish this it is desirable to have something in the nature of a frictional drag on the movement in both the horizontal and vertical planes and to make the frictional drag adjustable to the extent that a predetermined amount of resistance can be supplied to the movement which greatly improves the ease of making a manual adjustment and which likewise can be made sufficiently snug so that once the adjustment has been reached it will not easily be displaced or jarred out of a precise setting.

An object, therefore, of my invention is to provide a new and improved tripod head for mounting cameras which incorporates movement in both a vertical and horizontal direction for a camera mounting sufficiently sensitive so that accurate adjustments can be made.

Another object of my invention is to provide a new and improved tripod head for mounting a camera which incorporates a frictional adjustment for movement in both a horizontal plane and a vertical plane wherein the frictional surfaces are such that a very gradual increase or decrease in frictional pressure may be had in order to promote very careful control over movement of the camera for the so-called operation of panning either in a horizontal or vertical plane.

Still another object of my invention is to provide a new and improved adjustable tripod head for mounting a camera wherein a sensitive friction control for developing resistance to movement in either a horizontal or a vertical plane is likewise adapted to be utilized as a lock for holding the adjustment in proper position.

A further object of my invention is to provide an adjustable tripod head for mounting a camera in which is incorporated separate movements for shifting the mounting in either a horizontal or vertical direction and which utilizes an adjustment for varying the frictional resistance to movement in one of those directions as a control lever for turning the mounting in any desired direction.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 1 is a side elevational view of my device in the position it would occupy when mounted upon a tripod head in supporting a camera.

Fig. 2 is a plan view of the device shown in Fig. 1.

Fig. 3 is an end view on the line III—III of Fig. 2.

Fig. 4 is a longitudinal section taken on line IV—IV of Fig. 3.

Fig. 5 is a cross-sectional view taken on the line V—V of Fig. 4.

Fig. 6 is a partial longitudinal section on the line VI—VI of Fig. 4.

Fig. 7 is a detailed view of the split ring provided for controlling vertical movement.

Fig. 8 is a longitudinal section showing a modified form of the device for providing horizontal movement.

Fig. 9 is a longitudinal sectional view of a modified form of the base plate.

Fig. 10 is a plan view of a split ring used with the base plate in Fig. 9.

In providing a tripod head for mounting a camera upon the usual tripod, it must be borne in mind that the tripod head must be capable of adaptation to a wide variety of tripods. In the case of commercial tripods which are made heavy and substantial, less care need be taken with respect to a very precise adjustment for the camera because large tripods tend to remain set in position and are not easily disturbed by the operator when making adjustments of the camera mounting.

In the use of smaller tripods which find wide utility in the amateur field, the structure is likely to be much lighter and less stable when erected. This is particularly true of the collapsible type of tripod which can be packed up into a small package for easy transportation, such as the tripods carried about by some commercial photographers and amateurs.

Since a great deal of the time of a photographer is occupied in setting his camera with respect to the pictorial object so that he gets as nearly as possible the correct conception of his picture on the initial shot, it becomes highly desirable to have a tripod head for mounting the camera quickly and easily adjustable so that it can be readily moved short distances to the right or left, or up or down, in order that the subject may be properly located within the field of view. When lightweight tripods are used they may very easily be kicked out of adjustment or even disturbed by the operator when working with the camera and unless the mounting for the camera is particularly efficient, the camera may shift between the time that it is focused on the subject and the time the shutter is opened, so that the subject will not be in the best position with respect to the field of view.

Tripods, of course, being made of metal, are prone to expand and contract as the temperature varies. When the frictional adjustment for movement for one plane or another is very precise, a difference in temperature may make it too tight or too loose for most efficient operation. It accordingly becomes desirable to have an adjustment for the movement which is very gradual and very accurate and operable regardless of temperature conditions in order to maintain a very precise and accurate control over the movement.

In an embodiment chosen to illustrate my invention there is shown an adjustable tripod head which incorporates these desirable features and which is embodied in a base plate 10 provided with a threaded recess 12 which is designed to be screw threaded upon the top plate of a tripod 8. Upon the base plate is a frame 14 which is designed to rotate with respect to the base plate and which is connected to the base plate with a certain adjustable operating mechanism which is adapted to supply a variable resistance to the rotation of one with respect to the other for adjusting a camera 6.

As shown, the lower portion of the frame is provided with a cylindrical recess 16 on the lower side and positioned within the recess is a projection 18 integral with and extending upwardly from the base plate. The projection is substantially frusto-conical in shape with the base or large diameter of the cone remote from the base plate. This provides a substantially wedge-shaped, undercut recess annular in shape between the wall of the frusto-conical projection and the top face of the base plate.

Within the cylindrical recess and partially filling the undercut recess are positioned two halves 20 and 22 of a ring. The two halves together are slightly less than a full annulus so that they leave a narrow space 24 at one side and a correspondingly narrow space 26 on the opposite side. Each half is held in place by a screw 28 which extends through the lower portion of the frame and into threaded engagement with the adjacent end of the half ring.

On the opposite side of the lower portion of the frame, there is provided an adjusting rod 30 which has a threaded end 32 in engagement with the frame and extending through the frame into the cylindrical recess where it can be advanced into endwise pressure contact partly with one of the half rings and partly with the other. For convenience, the adjacent side of each half ring is flattened a slight amount so that there will be a larger bearing area against which the adjusting rod can press. The adjusting rod is provided with a handle 34 for convenience in operation.

Furthermore, the portion of the base of the frame forming a partition 36 and comprising the bottom of the cylindrical recess has an opening 38 through it slightly larger in diameter than the outside diameter of the threaded aperture 12 so that in the event a tripod has a screw on it slightly longer than average, it will be permitted to extend into and accommodate itself to the tripod head herein described.

It should further be noted that the inside corner of the half rings as viewed in cross section are cut off so as to leave a small space at the inside corner in the annular recess formed by the undercut which is capable of acting as a reservoir for lubricant.

A camera support 40 is designed to be tiltably mounted upon a pair of brackets or trunnions 42 and 44 carried by the frame. The camera support has a downwardly extending portion or knuckle 46 which is located in the space between the brackets and extends downwardly to within a relatively short distance of the top of the lower portion of the frame. The knuckle 46 fits snugly but not tightly between the brackets in order that it may be rotated with respect to the brackets during operation of the device. Within the knuckle is a horizontal bore 48 which extends entirely through it and within which is positioned the frictional adjusting mechanism which controls movement of the camera support in a vertical plane. The frictional adjusting mechanism includes a central shaft 50 which has an end 52 large enough in diameter so that it has a snug, rotating fit within the bore 48 at one end. The shaft has a small end 54 extending through the bore to the opposite side. Each end of the shaft is provided with a threaded recess 56 adapted to receive a screw 58 which extends through the brackets of the frame and into the threaded recess in order to lock the shaft in position. In order to additionally insure that the shaft will remain in proper position, there is provided a set screw 60 eccentric with respect to the center of the shaft and inset beneath the head of the screw 58.

At the small end 54 of the shaft there is mounted a sleeve 62. The sleeve is designed with an inside diameter permitting it to rotate freely about the small end of the shaft and with an outside diameter permitting it to rotate freely within the bore 48.

It will be noted that the inside face 64 of the sleeve is beveled in a direction opposite to the inside face 66 of the large end of the shaft so that between them they form an annular space smaller at the side nearest the shaft.

Centrally disposed with respect to the ends of the shaft and filling the annular space between the beveled faces, is a split ring 68, details of which appear in Fig. 7. As there shown it will be noted that the ring is split in two directions. One split 70 forms a space which permits adjacent portions of the ring to move a slight amount circumferentially. Another split 72 extends circumferentially approximately halfway around the split ring and permits the portions separated by the split to move a slight distance axially with respect to each other.

The split ring is held in position within the bore 48 by means of a screw 74 extending into the solid unsplit portion of the ring so that it will be fixed in position relative to the camera support and will rotate with it about the horizontal axis defined by the shaft 50. A vertical motion adjusting rod 76 provided with a handle 78 has a threaded end 80 extending into the lower portion or knuckle of the camera support until it enters the bore 48, where it is located so as to be threaded into contact with the split ring 68. In order to accommodate the end of the adjusting rod which is provided with a blunt point 81, the split ring has a conical recess 82 and for convenience may also be provided with a slightly flat area 84 on the cylindrical outer surface adjacent the conical recess.

For securing the camera to the camera support, there is provided a clamping wheel 86 of particular design from which extends a clamping screw 88. For mounting the clamping screw there is provided a shallow bearing recess 90 in the camera support within which rotates what may be termed a stub shaft 92 on the clamping wheel. The upper portion of the camera support is provided with a recess 94 designed to accommodate the clamping wheel.

For holding the wheel in place a retaining plate 96 is fitted over the top of the recess and attached to the camera support by a series of three machine screws 98. The retaining plate is provided with a central aperture 100 through which extends the clamping screw 88 which is a part of the clamping wheel.

In order that the clamping wheel may be manipulated, at one side 102 it is permitted to extend outwardly a short distance beyond the face of the camera support. To further facilitate manipulation of the clamping wheel, the rim of the wheel is provided with a series of circular apertures 104 circumferentially disposed with their centers spaced inwardly from the outside circumference of the wheel. The space of the centers of the apertures, however, is made such that the apertures intersect the circumference of the wheel and thereby provide slots in the wheel into which a coin or some other object may be inserted to assist in turning the clamping wheel when it is fastened to the base of the camera or released therefrom. The shape and relative location of the apertures can best be viewed in Fig. 2.

As an alternate construction I have shown a base plate 106 having the usual threaded aperture 108 designed to be attached to a screw on a tripod head. The base plate is provided with an annular recess 110 and at the center of the recess is a boss 112 which provides an additional depth for the threaded aperture 108 made necessary if a partition 114 forming a bottom for the recess is to be kept thin in order to use as little metal as required by the base without sacrificing a sturdy construction.

In a construction of this kind a camera support 116 has a downwardly extending projection 118, frusto-conical in shape, providing thereby an undercut recess 120 between the wall of the frusto-cone and an adjoining lower face 122 of the camera support.

In other respects the modified form is similar to the form first described in that there are provided two halves of a ring, one half 124 of which is illustrated in Fig. 8. The half rings operate in the same manner as described in connection with the first embodiment in that they are pressed into frictional contact with the wall of the recess by manipulation of a horizontal adjusting rod 126 provided in this case with a handle 128 fitting relatively snugly against the base plate.

A second modified form of the invention is illustrated in Figs. 9 and 10. In this form there is provided a base plate 130 having an exteriorly threaded boss 132 substantially cylindrical in shape. A threaded aperture 131 is provided to receive the screw on the top of a tripod.

In this embodiment the frusto-conical construction is preserved by applying to the threaded boss a ring 133 having a threaded aperture therethrough designed to fit upon the threaded boss and having a frusto-conical outer wall 136. When the ring is threaded into place, the combined parts 130 and 133 present substantially the structural appearance of the base plate 10 and the projection 18. A lock nut 134 is likewise threaded upon the boss so as to securely lock the ring 133 in place.

In this embodiment a single split ring 135, illustrated in Fig. 10, is used. The split ring has a wedge-shaped cross section as illustrated in Fig. 9 and is positioned so that its sloping face 137 fits against the frusto-conical outer surface of the ring 133. The initial fit is loose so that the split ring can rotate freely relative to the ring 133. When the parts are assembled the split ring is applied first and the other parts then threadedly attached.

For securing the ring in position there is provided a threaded aperture 140 into which a screw passed through the frame can be secured. In this modification the ring is provided with a single split 138 and has a flat side 139 adapted to receive the end of the adjusting rod 30.

In the operation of my device the tripod head is first mounted upon a tripod by attaching a screw in the top of the tripod to the base plate 10 with the screw extending through the threaded aperture 12. Then the base of a camera is attached to the camera support 40 by means of the clamping screw 88.

When the camera has thus been mounted upon a tripod it is provided with horizontal and vertical movements incorporated in the tripod head. For horizontal movement the camera support, together with the frame 14, rotates with respect to the base plate 10 about the center of the frusto-conical projection 18 as an axis. To resist the rotation of one with respect to the other, the operator may rotate the adjusting rod 30 so that it screws into the lower portion of the frame. As it is extended into the frame and into the cylindrical recess therein, it bears against the sides of the half rings 20 and 22 where they are spaced one from another at one end. Pressure of the adjusting rod against the rings tends to deflect them a slight amount so that their inner beveled faces bear against the sloping portion of the undercut, annular recess. Since the half rings extend each approximately halfway around the annular recess, the frictional force exerted by pressing them against the face of the recess is distributed over a relatively large area. Hence, a slight turn of the adjusting rod will produce a uniform and relatively slight increase or decrease in the frictional force between the respectively moving parts.

By this adjustment the resistance to rotation of the frame about the base plate may be made very slightly greater by a partial rotation of the adjusting rod. The resistance can be increased by small increments as much as desired until it is sufficiently great that it will lock one part with respect to the other. It will be noted that the clamping action of the split ring against the frusto-conical member (when the rod or lever 30 is rotated about its axis with some force) is translated by the conical side of the member into a downward movement of the frame 14 onto the base plate 10, thereby bringing into play the horizontal surfaces of frame 14 in contact with base 10 and locking the parts firmly together. Correspondingly, once locked, the parts can be released by the same gradual degree by a reverse rotation of the adjusting rod.

In adjusting the tripod head for vertical movement, the vertical adjusting rod 76 is threaded into and out of contact with the split ring 68. Let us presume, for the purpose of description, that the camera support has initially unrestricted movement in a vertical plane about its supporting shaft 50. To increase resistance to the movement, the vertical adjusting rod 76 is threaded inwardly so that its pointed end is forced into contact with the conical recess formed in the split ring. As the rod is advanced the pointed end spreads the parts of the split ring on opposite sides of the split 72. As the parts of the ring are spread, beveled edges which are in contact respectively with the beveled faces 64 and 66 cause an increase in frictional resistance between the split ring and respectively the large end 52 of the shaft and the sleeve 62. Spreading of the portions of the split ring may likewise tend to shift the position of the sleeve 62 endwise along the shaft so that there will be frictional contact between the end of the sleeve opposite from the beveled faces and the adjacent faces of the bracket on the frame. A slight increase in pressure, therefore, of the vertical adjusting rod 76 against the split ring will spread the increment in frictional force over a relatively large area so that its effect in resisting movement between the moving parts will be gradual and smooth. The frictional resistance can be thus gradually increased by rotation of the vertical adjusting rod until it is so great that it locks against rotation of the camera support with respect to the frame.

The frictional force for both vertical and horizontal movement is capable of such careful adjustment that the adjusting rod 30 for the horizontal movement may be shortened to a length illustrated in the modified form shown in Fig. 8. When this arrangement is resorted to, the vertical adjusting rod 76, which is permitted to remain long, can be used as a device for rotating the camera support in either a horizontal direction or a vertical direction. The construction, furthermore, of the adjoining portions of the camera support and the frame is such as to permit the camera support to be tilted so that the camera base is substantially vertical, permitting the camera to be pointed directly toward the ground.

In addition, it will be noted particularly in Fig. 2 that the vertical adjusting rod 76 may be extended at an angle relative to the horizontal adjusting rod 30 so that when the vertical rod is moved downwardly in order to tilt the camera support upwardly, it will pass the horizontal adjusting rod at one side and permit a much greater tilt. It will be apparent also that the adjusting rods may be manipulated to tighten or loosen the frictional control regardless of the adjusted position of the parts.

There has thus been provided a tripod head for mounting a camera upon a tripod capable of a very precise and gradual adjustment of both a vertical and horizontal movement which is sufficiently delicate so that the frictional adjustment can also be used as a lock for either movement without there being the likelihood of disturbing the setting of a camera as the parts are locked together by manipulation of the adjusting rods.

I claim:

1. A tripod head for adjustably supporting a camera comprising: a base plate adapted to be placed on a tripod having means thereon for securing it to the tripod, a camera-supporting plate mounted rotatably on the base plate, one of said plates having a central boss and the other of said plates having a depression therein adapted to receive the boss and having the wall of the depression spaced from the boss to form an annular space therearound; a split ring having a cross-sectional shape adapted to slidably fit within said annular space, retaining means for holding one end of the ring in place, and an adjusting rod extending through one of the plates and having an end in contact with the unretained end of said ring to press said ring frictionally against the walls of said annular space.

2. A tripod head for adjustably supporting a camera comprising a base member adapted to be mounted on a tripod and a horizontally rotating member mounted thereon adapted to support a camera, a rotatable connecting means between the members comprising a projection defining an annular recess on one member and a receiving pocket in the other member, a deformable element in the recess adapted to frictionally engage the sides thereof and an adjusting rod extending threadedly through one of said members into contact with the deformable element and adapted to regulate the amount of frictional engagement.

3. A tripod head for adjustably supporting a camera comprising a base plate adapted to be secured to a tripod, an exteriorly threaded boss on the side of the base plate remote from the tripod, a ring having an inwardly sloping exterior wall threadedly engaging the boss, a lock nut for locking said ring in place, and a split ring between the inwardly sloping exterior wall and the base plate held in place by said first ring and having a complementary sloping wall, a frame having a substantially cylindrical recess adapted to receive the rings and boss and a single screw connection between the frame and the split ring, said split ring having a single split through the circumference thereof and adapted to be pressed frictionally against the adjacent ring.

4. In a tripod head for adjustably positioning a camera, the combination of: a base, a frusto-conical member with its axis vertical and inclined surfaces directed inwardly and downwardly carried by the base; a frame carried by the base and mounted for rotation about a vertical axis; a recess in the frame adapted to receive the frusto-conical member; a split ring mounted in the recess, said split ring having an inner inclined surface adapted to slidably engage the inclined surfaces of the frusto-conical member; and a single means for imparting rotation to the frame and for varying the pressure of the split ring against said frusto-conical member.

5. In a tripod head of the character stated in claim 4, the provision of means for removably attaching the frusto-conical member to the base.

6. In a tripod head for adjustably positioning a camera, the combination of: a base plate, a frame mounted upon the base for rotation about a vertical axis; a camera support mounted upon the frame for rotation about a horizontal axis; means frictionally connecting the base plate and frame, said means including a central frusto-conical member and a split ring encircling the member, said ring having an inner inclined surface slidably engaging the conical surface of the member; and a single operating lever carried by the frame for imparting rotation to the frame and regulatably varying the pressure of the split ring against the member.

7. In a tripod head for adjustably positioning a camera and including a base plate, a frame mounted upon the base for rotation about a vertical axis, and a camera support carried by the frame, the combination of: a single operating lever carried by the frame for imparting rotation to the frame and for regulatably varying frictional resistance to such rotation; and means for mounting the camera support upon the frame for rotation about a horizontal action and for varying frictional resistance to such rotation, said means comprising a bored knuckle carried by the camera support, a fixed horizontal shaft carried by the frame and extending through the knuckle, an expandable sleeve mounted on the shaft within the knuckle, means for retaining said sleeve within the knuckle, and means carried by the camera support and extending into the knuckle into contact with the expandable sleeve for moving the camera support about a horizontal axis and varying frictional resistance to rotation of the camera support by expanding said sleeve.

8. In a tripod head for adjustably positioning a camera and including a base plate, a frame mounted upon the base for rotation about a vertical axis, and a camera support carried by the frame, the combination of: a single operating lever carried by the frame for imparting rotation to the frame and for regulatably varying frictional resistance to such rotation; and means for mounting the camera support upon the frame for rotation about a horizontal axis and varying frictional resistance to such rotation, said means comprising a bored knuckle carried by the camera support, a fixed horizontal shaft carried by the frame and extending through the knuckle, an expandable sleeve mounted on the shaft within the knuckle, said sleeve being split axially on one side and incompletely split circumferentially in one direction from said axial split to form a pair of spaced ring portions, each having a common end and a free end; means for retaining said split sleeve within the knuckle; means for connecting the common end of said ring portions to the knuckle; and means carried by the camera support and extending into the knuckle for regulatably moving the free ends of said ring portions to vary the frictional resistance to rotation of the camera support upon the frame.

9. In a camera tripod head a camera support including a bored knuckle; a fixed horizontal shaft; a pair of split ring portions slidably mounted on the shaft within the knuckle, one end of each ring being attached to the knuckle; means carried by the shaft in sliding engagement with outer sides of said split rings; and means carried by the camera support and extending into the knuckle and between free ends of said split rings for moving the free ends of said split rings into frictional engagement with said retaining means to vary the frictional resistance to rotation of the camera support upon the fixed horizontal shaft.

CARLOS J. CARDONA.

REFERENCES CITED

The following references are of record in the file of this patent:

UNITED STATES PATENTS

| Number | Name | Date |
|---|---|---|
| 1,919,554 | Howell | July 25, 1933 |
| 1,948,055 | Thalhammer | Feb. 20, 1934 |
| 2,143,606 | Mooney | Jan. 10, 1939 |
| 2,261,426 | Willcox | Nov. 4, 1941 |
| 1,854,951 | Neuwirth | Apr. 19, 1932 |